(12) United States Patent
Huang

(10) Patent No.: US 6,918,727 B2
(45) Date of Patent: Jul. 19, 2005

(54) ANCHORING SCREW WITH DOUBLE HEADS AND TRIPLE THREADS OF DIFFERENT DEPTHS OF THREAD

(75) Inventor: Pan-Ching Huang, Changhua (TW)

(73) Assignee: Joker Industrial Co., Ltd., Changhus (TW)

(*) Notice: Subject to any disclaimer, the term of this patent is extended or adjusted under 35 U.S.C. 154(b) by 0 days.

(21) Appl. No.: 10/756,270

(22) Filed: Jan. 14, 2004

(65) Prior Publication Data

US 2005/0129484 A1 Jun. 16, 2005

Related U.S. Application Data

(63) Continuation-in-part of application No. 10/135,355, filed on May 1, 2002, now abandoned.

(51) Int. Cl.⁷ .............................................. F16B 35/00
(52) U.S. Cl. ...................... 411/389; 411/412; 411/308; 411/107
(58) Field of Search ........................ 411/411–413, 416, 411/423, 389, 308–312, 82, 403, 107

(56) References Cited

U.S. PATENT DOCUMENTS

| | | | | |
|---|---|---|---|---|
| 3,180,202 A | * | 4/1965 | Kahn ........................ 411/386 |
| 3,897,713 A | * | 8/1975 | Gugle ........................ 411/389 |
| 4,304,503 A | * | 12/1981 | Gehring et al. ............. 411/389 |
| 4,334,815 A | * | 6/1982 | Knohl ........................ 411/368 |
| RE34,969 E | * | 6/1995 | Dixon et al. ................. 411/412 |
| 5,613,968 A | * | 3/1997 | Lin ............................. 606/61 |
| 2003/0206787 A1 | * | 11/2003 | Huang | |

* cited by examiner

Primary Examiner—William L. Miller
(74) Attorney, Agent, or Firm—Troxell Law Office, PLL

(57) ABSTRACT

An anchoring screw with triple threads of different depths of thread especially useful for coupling with a construction hole on a cement wall (or other construction boards and panels) includes a first bolt section, a tool driven section and a second bolt section. The second bolt section has a first screw thread, a second screw thread and a third screw thread of different depths of thread formed on the outer surface that are spaced from one another at 120 degrees. Thus, the screw threads can gather extruded cement debris when the screw is fastened into the construction hole to produce a stronger fastening effect. As there is no expansion incurred, the wall or board does not crack. Therefore, the interval between the construction holes may be shortened, and the number of construction holes may be increased in a given unit area. The anchoring screw of the invention also may be removed easily and conveniently to facilitate construction.

2 Claims, 9 Drawing Sheets

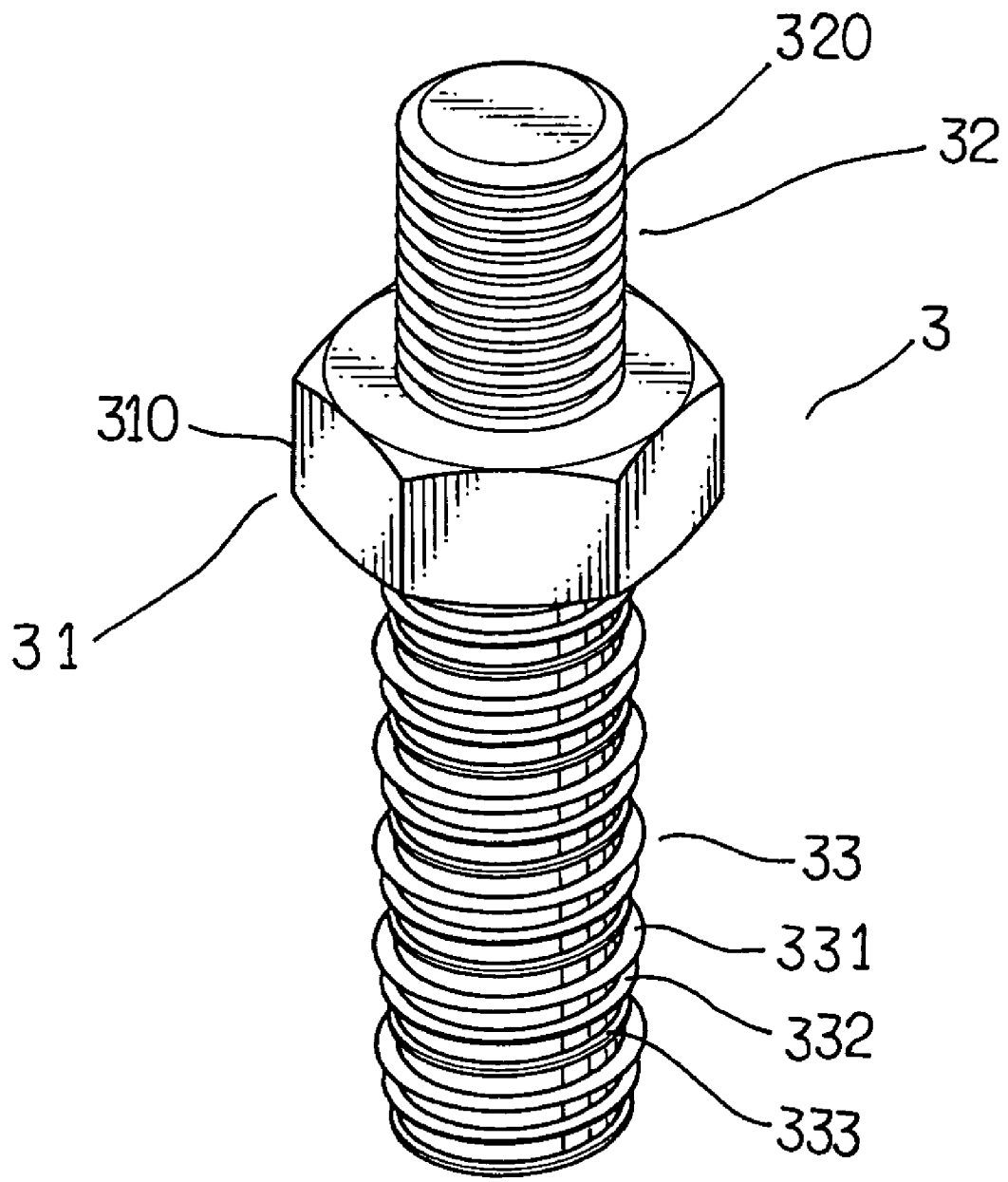
F I G. 2

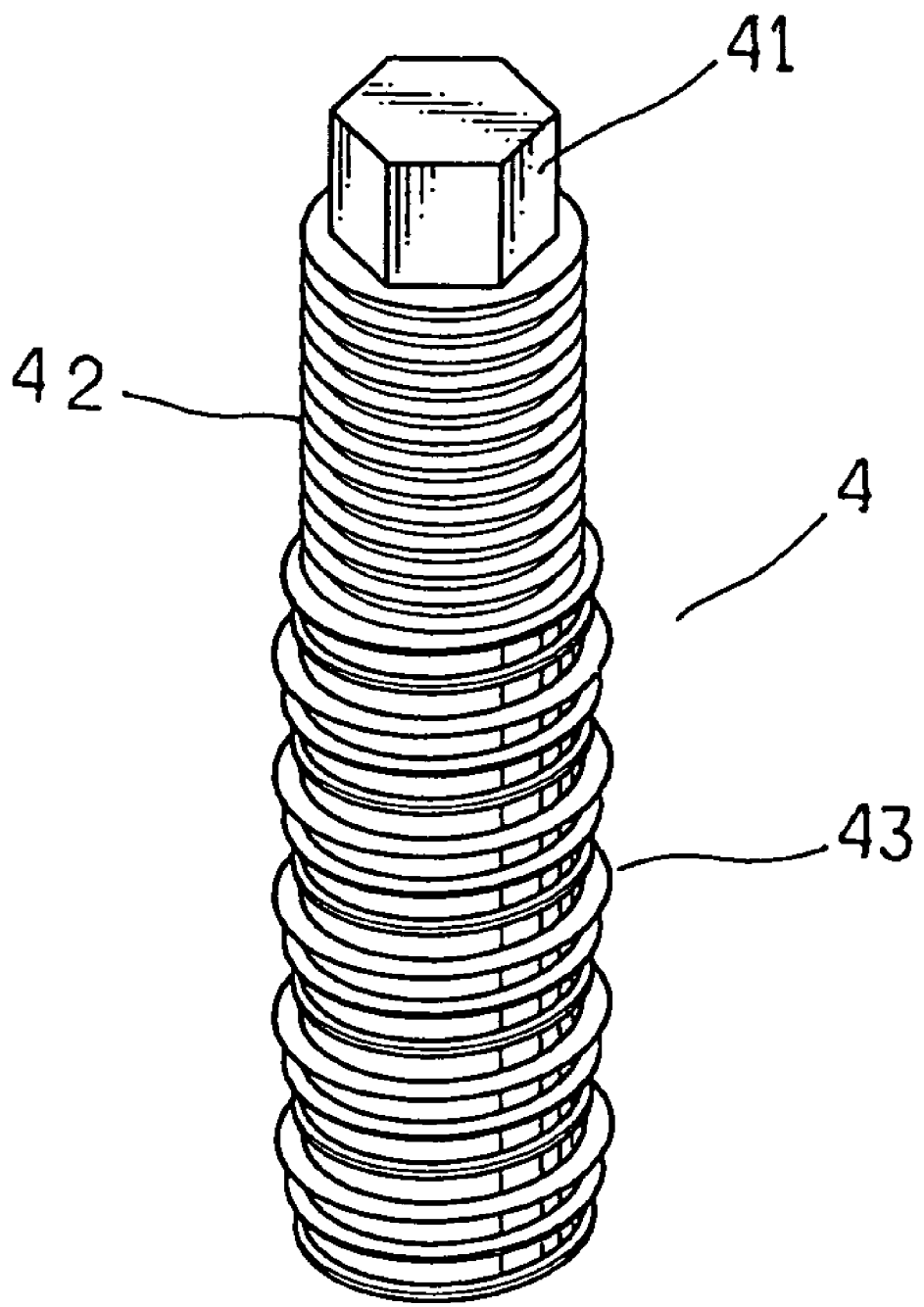
F I G. 7

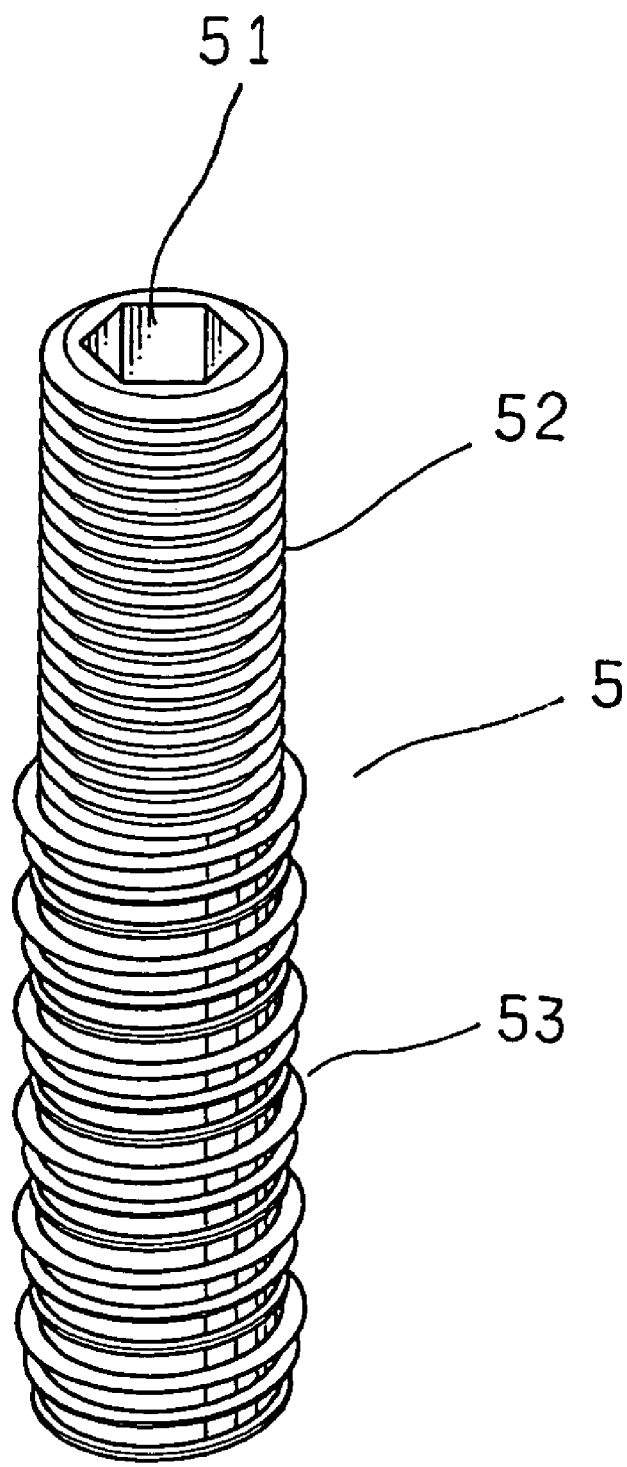
F I G. 9

ANCHORING SCREW WITH DOUBLE HEADS AND TRIPLE THREADS OF DIFFERENT DEPTHS OF THREAD

This application is a continuation-in-part of U.S. patent application Ser. No. 10/135,355, filed May 1, 2002, now abandoned.

BACKGROUND OF THE INVENTION

1. Field of the Invention

The invention relates to an anchoring screw that has triple threads of different depths of thread and particularly to an anchoring screw for fastening to cement walls (or other construction panels and boards).

2. Description of the Prior Art

Referring to FIG. 1, a conventional method for mounting or hanging articles on a cement wall 1 (or other construction boards and panels) usually is done by fastening an expanded screw 2 into a construction hole 11, then installing a bolt 21 therein for mounting or hanging an article or object desired. Such a construction method has many problems, notably:

1. Anchoring of the expanded screw 2 requires to use a special pliers or tool to pull the conical front end 211 of the bolt 21 to expand the nail fastener 22 to firmly engage with the construction hole 11. The cement wall is prone to crack during the expansion process. It is a big disadvantage of using such type of expanded screw.
2. Installing the expanded screw 2 requires a special pliers or tool, and makes construction work inconvenient.
3. Once the expanded screw 2 is installed and anchored in the construction hole 11, it is very difficult to remove.
4. As the expanded screw 2 tends to cause the cement wall crack around the construction hole, the interval between the construction holes must be increased to a longer distance, especially on the corners of the walls. As a result, the number of construction holes for a unit area of the wall surface is limited, and the coupling strength between the wall and boards is affected, and the number of articles or objects that can be supported or hung is restricted.

SUMMARY OF THE INVENTION

In view of the aforesaid disadvantages, the invention aims to provide an improved anchoring screw that includes a first bolt section, a tool driven section and a second bolt section. The second bolt section has a first screw thread, a second screw thread and a third screw thread formed on the surface that are spaced angularly from one another at 120 degrees and have screw edges of different heights for gathering cement debris generated during installation and extruding processes thereby to create a greater fastening effect. As there is no expansion incurred, the wall or board does not crack, and the interval between the construction holes may be shortened. As a result, non-usable anchoring areas near the corners of the wall can be reduced, and number of construction holes may be increased on a given unit area. The anchoring screw of the invention also may be removed easily and conveniently to facilitate construction.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 2 is a perspective view of the invention.

FIG. 7 is a perspective view of another embodiment of the invention.

FIG. 9 is a perspective view of yet another embodiment of the invention.

DESCRIPTION OF THE PREFERRED EMBODIMENTS

Figure 1:
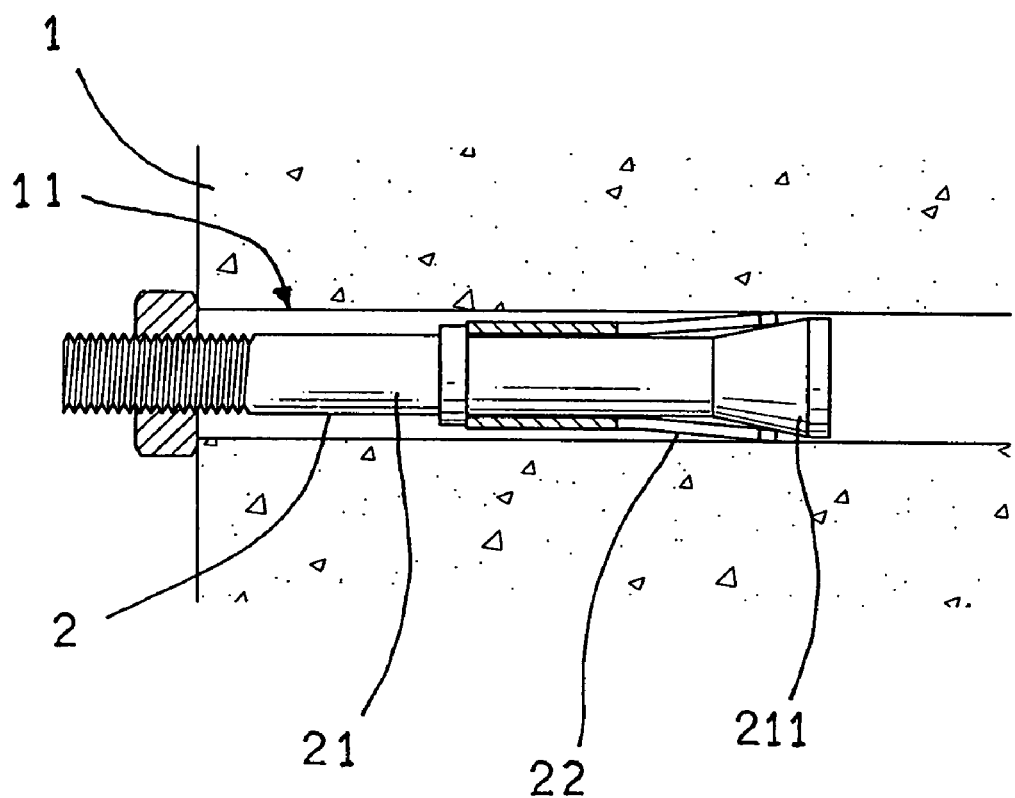
FIG. 1 is a schematic view of a conventional expanded screw in an operating condition.
Figure 3:
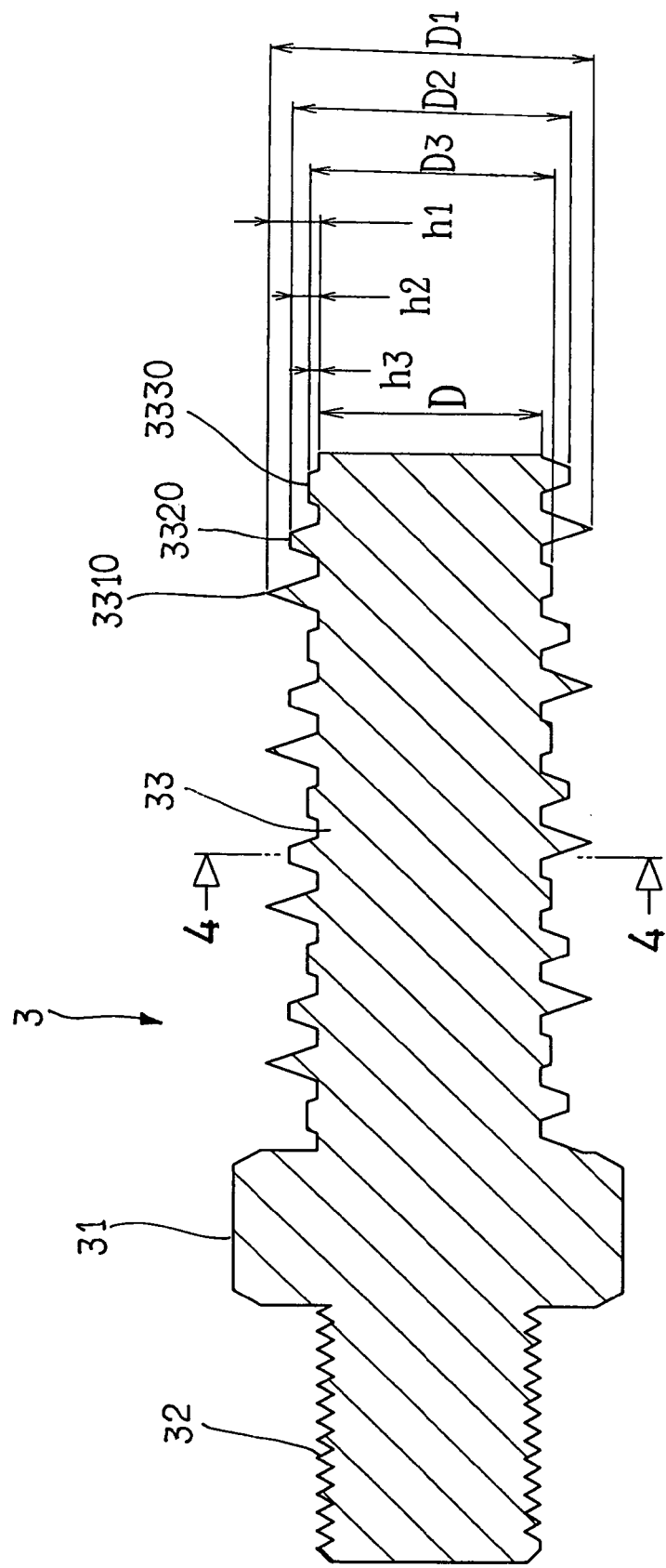
FIG. 3 is a sectional view of the invention.
Figure 4:
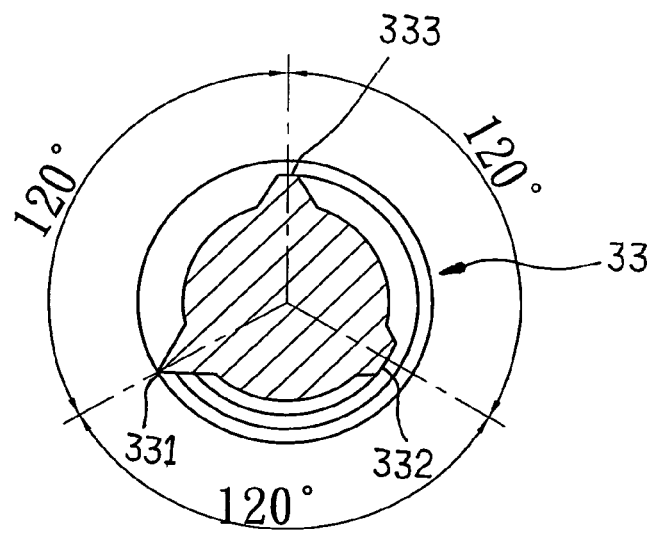
FIG. 4 is a cross section according to FIG. 3.

Referring to FIGS. 2, 3 and 4, the screw 3 according to the invention includes a first bolt section 32, a tool driven section 31 and a second bolt section 33.

The first bolt section 32 has an external screw thread 320 formed on the outer surface.

The tool driven section 31 is located at one end of the first bolt section 32 to couple with a tool for fastening the screw 3. It has a polygonal flange 310.

The second bolt section 33 has a first screw thread 331, a second screw thread 332 and a third screw thread 333 formed on the outer surface thereof and spaced from one another at 120 degrees angularly. The first screw thread has a screw edge height h1, the second screw thread has a screw edge height h2, and the third screw thread has a screw edge height h3 that are different from one another (the screw edge height also is called Depth of Thread; where h1>h2>h3; and the diameters of the corresponding screw edges are D1, D2 and D3, where D1>D2>D3; and D1, D2 or D3 is greater than the stem diameter D of the second bolt section 33).

Figure 5:
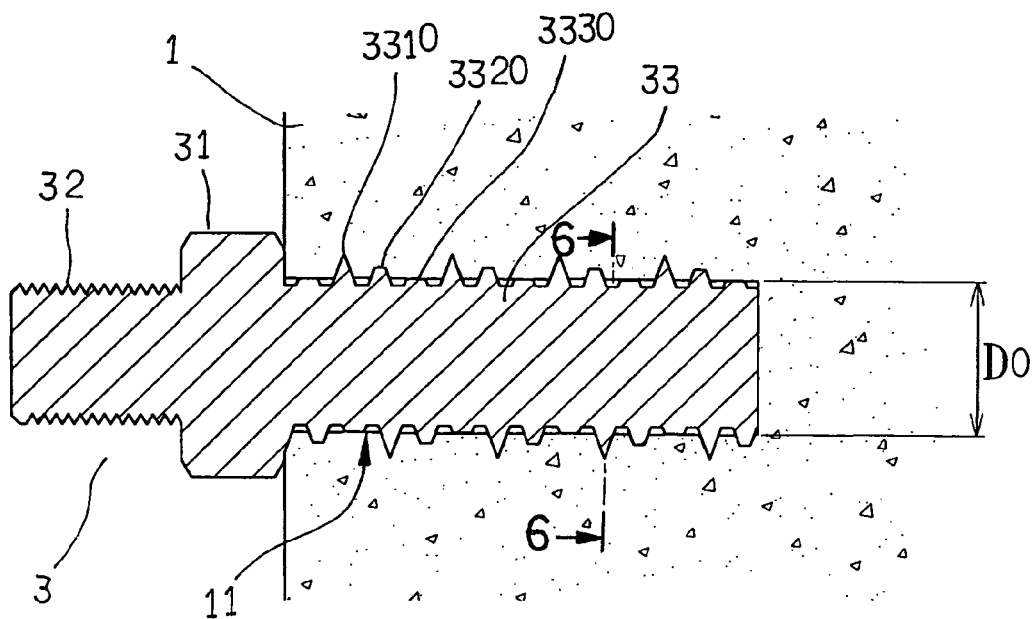
FIG. 5 is a schematic view of the invention in an operating condition.
Figure 6:
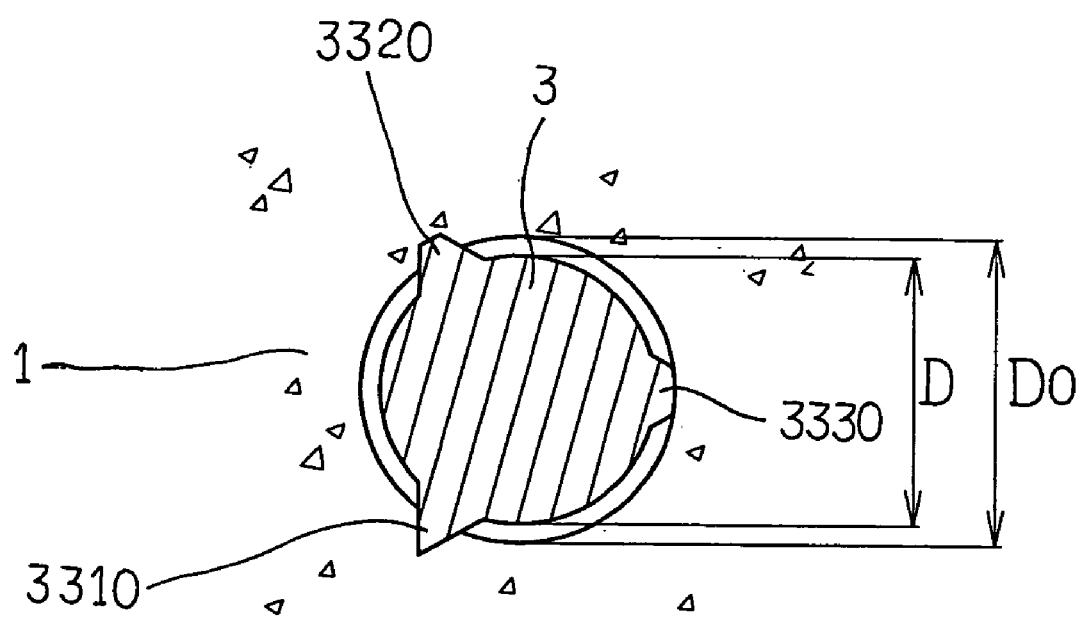
FIG. 6 is a cross section according to FIG. 5.

By means of the structure set forth above when in use, the second bolt section 33 of the screw is fastened into a construction hole 11 of a cement wall 1 (referring to FIGS. 5 and 6), as the screw edge diameter D1 of the first screw thread 331 is greater than the diameter D0 of the construction hole 11 (i.e. D1>D0), a first screw edge 3310 enters the construction hole by primary slicing the hole diameter D0. A second screw edge diameter D2 of the second screw thread 332 is slightly greater than the diameter D0 of the construction hole 11 but smaller than the screw edge diameter D1 of the first screw thread 331 (i.e. D1>D2>D0), thus the second screw edge 3320 enters the construction hole 11 by assisting slicing the hole diameter D0, and channels and extrudes the debris sliced by the first screw thread 331 backwards. The third screw edge diameter D3 of the third screw thread 333 is substantially equal to the hole diameter D0 of the construction hole 11 (i.e. D0=D3, and D1>D2>D3), therefore a third screw edge 3330 of the third screw serves to ram against the hole surface of the construction hole 11. The first screw edge 3310, second screw edge 3320 and third screw edge 3330 maintain a three-point balance condition on a force receiving cross section. Thus the screw 33 may be disposed into the construction hole 11 in a straight line. Moreover, the invention can also gather extruded cement debris to generate a stronger fastening effect. As there is no expansion, the wall or board does not crack. Hence the interval between the construction holes may be shortened. As a result, non-usable anchoring areas near the corners of the wall can be reduced, and number of construction holes may be increased on a given unit area. The anchoring screw of the invention also may be removed easily and conveniently to facilitate construction.

Figure 8:
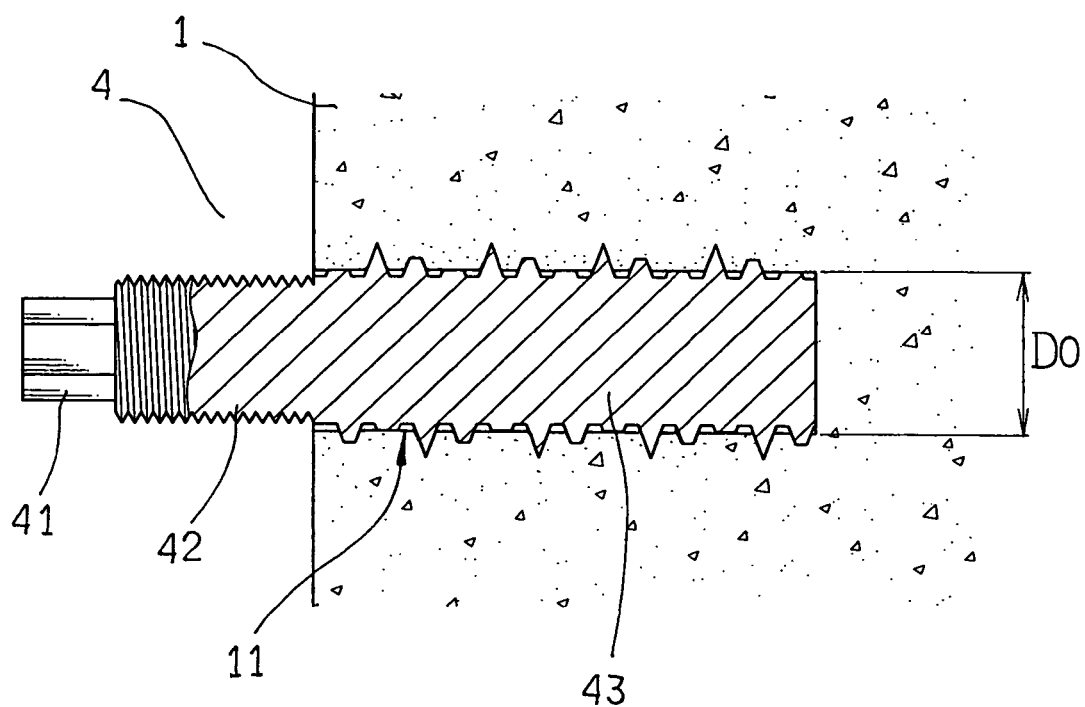
FIG. 8 is a schematic view of another embodiment of the invention in an operating condition.

Refer to FIGS. 7 and 8 for another embodiment of the invention. The screw 4 includes a second bolt section 43 which has three screw threads formed on the outer surface that are spaced angularly from one another at 120 degrees. The screw edges have different heights (same as the embodiment shown in FIG. 2). The difference is that the tool driven section 41 for coupling with tools for fastening is located at the top end of the first bolt section 42 (i.e. on a bolt section exposed outside the construction hole) and the tool driven section 41 has an outer diameter smaller than the first bolt section 42 so that external objects may be coupled with the first bolt section 42 without being hindered by the tool driven section 41.

Figure 10:
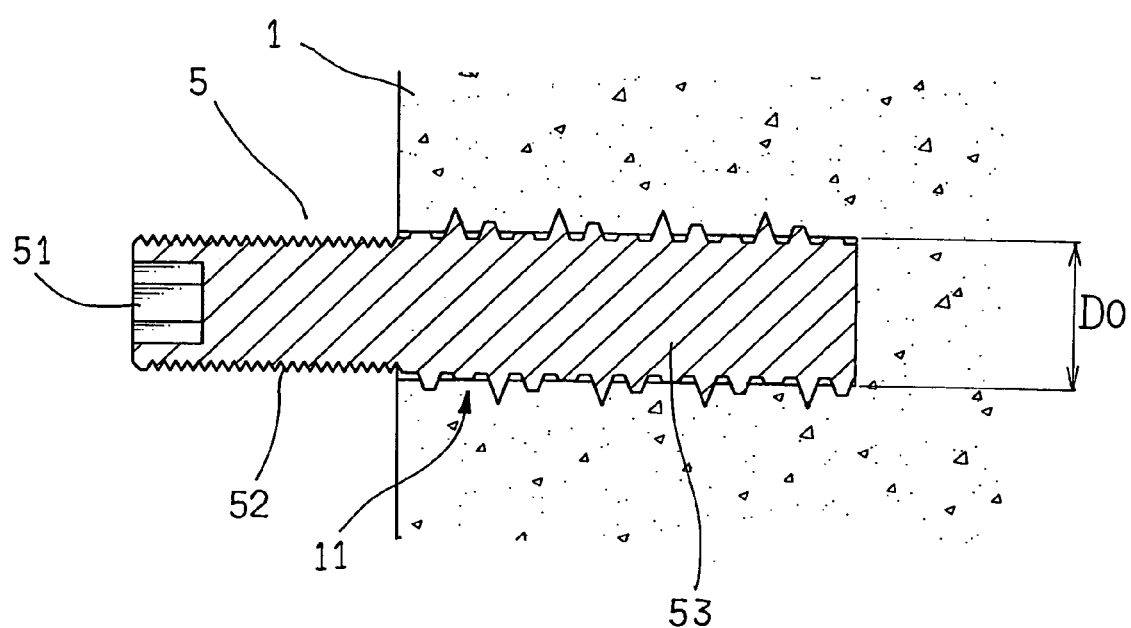
FIG. 10 is a schematic view of yet another embodiment of the invention in an operating condition.

Refer to FIGS. 9 and 10 for yet another embodiment of the invention. The screw 5 includes a second bolt section 53 which has three screw threads formed on the outer surface that are spaced angularly from one another at 120 degrees. The screw edges have different heights (same as the embodiment shown in FIG. 2). However, the tool driven section 51 for coupling with tools for fastening use is a polygonal sunken cavity formed on the top end of the first bolt section 52 (i.e. in a bolt section exposed outside the construction hole). A wrench may be coupled with the tool driven section 51 to perform fastening operation.

By means of the construction set forth above, the screw of the invention may be operated and fastened by a general wrench without using special tools, and the screw may be fastened and anchored firmly without skewing. The screw of the invention can also gather cement debris to produce a greater fastening effect. As there is no expansion when the invention is installed, cracks on the walls or boards that might otherwise incur may be avoided from happening. The screw of the invention also is easy to remove when desired. All this provides significant improvements and greater benefits.

I claim:

1. An anchoring screw comprising:
 a) a first bolt section having an external thread formed on an exterior thereof;
 b) a second bolt section having first, second, and third screw threads equally spaced on an exterior periphery thereof, each of the screw threads having a different thread height, wherein the height of the first screw thread is greater than the height of the second screw thread, and the height of the second threw thread is greater than the height of the third screw thread, the third screw thread being located adjacent the free end of the second bolt section; and
 c) a tool driven section located between the first bolt section and the second bolt section, wherein the tool driven section is a polygonal flange located adjacent to an end of the first, the second and the third screw threads on a first tool driven section end and located adjacent to an end of the external thread of the first bolt section on a second tool driven section end.

2. The anchoring screw according to claim 1, wherein a first screw edge of the first screw thread, a second screw edge of the second screw thread and a third screw edge of the third screw thread maintain a three-point balanced condition on a force receiving cross section.

* * * * *